Figure 7:
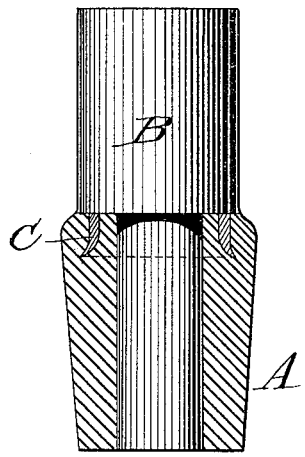

(No Model.) 2 Sheets—Sheet 1.
F. W. STARR.
VEHICLE WHEEL.
No. 353,831. Patented Dec. 7, 1886.
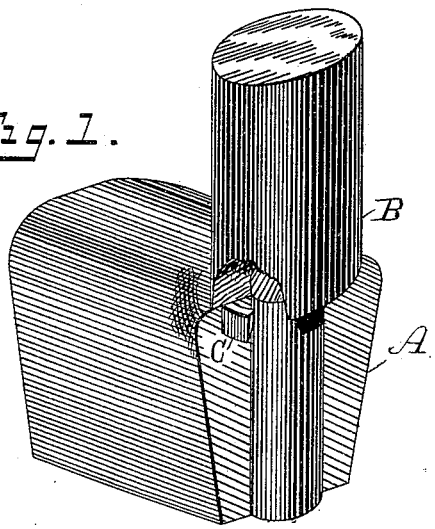
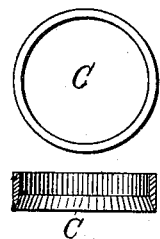
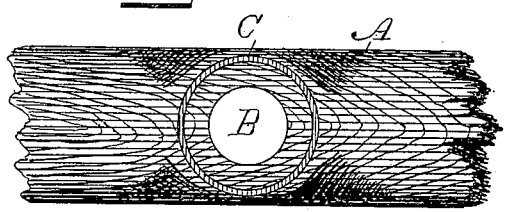
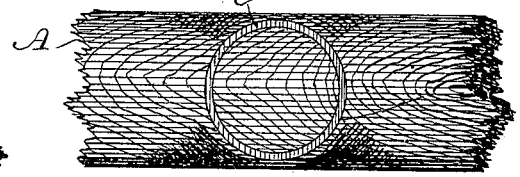
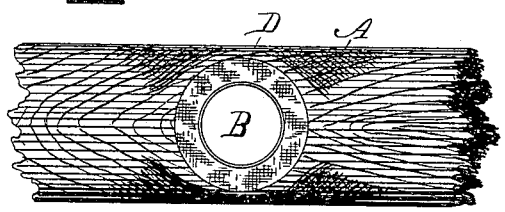
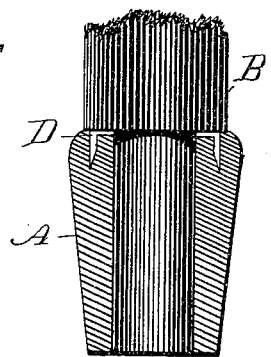
Witnesses:
Chas Stewart
E. N. McMillen
Inventor.
Ferdinand W. Starr (No Model.) 2 Sheets—Sheet 2.

F. W. STARR.
VEHICLE WHEEL.

No. 353,831. Patented Dec. 7, 1886.

Witnesses:
Fred State.
Sam'l J. Wilkerson.

Inventor.
Ferdinand W<sup>m</sup> Starr

UNITED STATES PATENT OFFICE.

FERDINAND W. STARR, OF SPRINGFIELD, OHIO.

VEHICLE-WHEEL.

SPECIFICATION forming part of Letters Patent No. 353,831, dated December 7, 1886.

Application filed July 9, 1886. Serial No. 207,612. (No model.)

*To all whom it may concern:*

Be it known that I, FERDINAND WILLIAM STARR, a citizen of the United States, residing at Springfield, in the county of Clark and State of Ohio, have invented a new and useful Improvement in Wheels, of which the following is a specification.

My invention relates, particularly, to an improvement in wooden rims or fellies for vehicle-wheels, and the method of applying said improvement to the rim and wheel.

My invention consists in driving or pressing thin sharpened metal rings into the substance of the rim or felly at points where the spoke-tenons are to enter, and afterward boring the holes for the spoke-tenons in the inside of these rings, so that when the rim is driven upon the spoke-tenons the shoulders of spokes at the rim will cover and conceal the rings; and the object of my improvement is to produce a vehicle-wheel which shall have the appearance of wheels of common or ordinary construction, particularly as relates to the rims thereof, and yet embodying within the rim concealed means to prevent the rim or fellies from splitting out from the holes bored for the reception of the spoke-tenons, and also producing a more permanently durable bearing for the spoke-shoulders. I attain these objects by the construction illustrated in the accompanying drawings, in which—

Figure 1 is a perspective view showing in broken section my improvement. Fig. 2 is a plan view with spoke removed. Fig. 3 is a plan view with the sharpened ring driven into the rim before boring the hole for the spoke-tenon. Fig. 4 is a plan view of modification, and Fig. 5 is a section of same. Fig. 6 is a plan and section of a thin metallic ring whose inner and outer sides are preferably parallel to each other—that is, the ring or band being of nearly uniform thickness, except the edge, which is sharpened, so that it may be driven or pressed into the rim. Fig. 7 is a section of rim and ring, with spoke in elevation, in which the ring is represented with its edge spread laterally, which condition is produced in the operation of driving the ring into the rim, the edge of the ring having a bevel which tends to spread when driven in the wood, and thereby prevents the retraction of the ring. The amount of divergence of the edge of ring after being driven into the rim will of course depend upon the inclination imparted to the ring before pressing it into the wood.

In the several views, A is the rim or felly. B is the spoke. C is the ring, ferrule, or strengthening-band.

D, Figs. 4 and 5, shows the ring in plan and section, with an integral overlapping flange, by use of which greater area of metallic bearing for spoke-shoulder and rim is secured, and the wood within the ring and around the hole for the spoke-tenon is thus securely held in place and the spoke shoulder prevented from setting into the rim or felly. When the wheel is subjected to severe service, these overlapping flanges may extend more or less in or out, as may be desired.

The sharpened edge of ring may be waved or serrated; or the edge may be so inclined that in driving it into the rim it would clinch itself in the wood, as clearly shown on Sheet No. 2 in the view, Fig. 7, C being the ring clinched in the wood, as described, and thereby prevent its retraction. These rings are preferably made to conform in shape to the cross-section of the spokes where they join the rim, though, if desired, the rings may be permitted to project outside the spoke-shoulders. In applying these rings to the rims or fellies for wheels, they (the rings) are driven or pressed into the rim at such distance apart as to correspond to the distance of the spoke-tenons upon which they are to be driven, after which the holes for the spoke-tenons are bored within the rings, when the rims may be driven upon the spokes or finished as in the ordinary way.

I am aware that metal washers have been placed between the shoulders of spokes and rims, and that many devices have been patented with a view of providing a more durable connection of spokes with rim, and to prevent the rim from splitting out from the holes bored for the spoke-tenons; also, that thimbles have been driven into the bored holes in rims for wheels so as to provide a metal lining. I claim none of these features.

I am also aware of patent granted to George Carlisle, September 8, 1874, No. 154,834, for the purpose of fastening a tip upon tool-handles, in the construction of which a ring somewhat similar to mine is employed, but different from mine, in that his band D is made tapering upon the inside, so as to "correspond" with the contracted portion of the tip-tenons C; and, further, the method of construction employed in the Carlisle tool-handle materially differs from that employed in this my invention as applied to wheels, which will be apparent upon comparison. Besides, I do not desire to claim a strengthening-ring, broadly, or as applied to tool-handles.

The rings may be roughened or corrugated, to make them adhere more strongly in the wood.

What I claim as new, and desire to secure by Letters Patent, is—

1. In a wheel, the combination, with the rim thereof having holes for the spoke-tenons, of metallic rings fitted into the rim outside of and around the said holes to prevent the rims from splitting.

2. In a wheel, the combination, with the rim thereof constructed of wood, of short thin metallic rings having one end sharpened and embedded into the rim around and outside of the holes for the spoke-tenons.

3. In a wheel, the combination, with the rim thereof constructed of wood, of metallic rings sharpened from their inner side at one end, leaving the interior beveled at said end and embedded into the rim outside of and around the holes for the spoke-tenons, the bevel being such as to cause the rings to flare and clinch themselves in the wood.

4. In a wheel, the combination, with the rim thereof constructed of wood, of the metallic rings having a flange at one end and embedded into the rim outside of and around the holes for the spokes sufficiently to leave the flange flush, or substantially flush, with the rim.

5. In a wheel, the combination, with the rim thereof constructed of wood, of thin metallic rings having a flange at one end and having the other end sharpened from the inner side to form a bevel, and embedded into the rim outside of and around the holes for the spokes, the sharpened end clinching itself in the wood and the flange forming a shoulder for the spokes.

FERDINAND W. STARR.

Witnesses:
E. W. McMILLEN,
CHASE STEWART.